US006903332B2

(12) United States Patent
Weiss et al.

(10) Patent No.: US 6,903,332 B2
(45) Date of Patent: Jun. 7, 2005

(54) PULSERS FOR TIME-OF-FLIGHT MASS SPECTROMETERS WITH ORTHOGONAL ION INJECTION

(75) Inventors: Gerhard Weiss, Weyhe (DE); Carsten Stoermer, Bremen (DE); Oliver Räther, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 10/303,661

(22) Filed: Nov. 25, 2002

(65) Prior Publication Data

US 2003/0168590 A1 Sep. 11, 2003

(30) Foreign Application Priority Data

Nov. 30, 2001 (DE) ........................................ 101 58 924

(51) Int. Cl.[7] .......................... H01J 49/40; H01J 49/00; B01D 54/44

(52) U.S. Cl. ........................ 250/287; 250/281; 250/295

(58) Field of Search ................................ 250/282, 281, 250/288, 287, 295

(56) References Cited

U.S. PATENT DOCUMENTS

| | | | | | |
|---|---|---|---|---|---|
| 5,742,049 | A | * | 4/1998 | Holle et al. | 250/282 |
| 5,777,325 | A | * | 7/1998 | Weinberger et al. | 250/287 |
| 5,886,345 | A | * | 3/1999 | Koster et al. | 250/282 |
| 5,905,259 | A | * | 5/1999 | Franzen | 250/287 |
| 5,969,348 | A | * | 10/1999 | Franzen | 250/282 |
| 6,518,568 | B1 | * | 2/2003 | Kovtoun et al. | 250/287 |
| 2001/0011703 | A1 | | 8/2001 | Franzen | |

FOREIGN PATENT DOCUMENTS

| | | | | |
|---|---|---|---|---|
| GB | 2 361 353 | A | | 10/2001 |
| WO | WO 97/48120 | | * | 12/1997 |
| WO | WO 98/00224 | A1 | | 1/1998 |
| WO | WO 01/11660 | A1 | | 2/2001 |
| WO | WO 01/11660 | | * | 2/2001 |
| WO | WO 01/27971 | A1 | | 4/2001 |

OTHER PUBLICATIONS

Wiley, W.C. et al., "Time–of–Flight Mass Spectrometer with Improved Resolution", The Review of Scientific Instruments, vol. 26, No. 12, Dec., 1955, pp. 1150–1157.

* cited by examiner

*Primary Examiner*—John R. Lee
*Assistant Examiner*—Kalimah Fernandez

(57) ABSTRACT

The invention relates to the construction and operation of a slit diaphragm pulser for a time-of-flight mass spectrometer with orthogonal injection of the ions to be examined. The invention includes switching three diaphragm potentials during a transition from a filling phase to an acceleration phase in order to maintain a potential along the axis of the injected ion beam at a constant level, to prevent any penetration by the accelerating fields during the filling phase and to obtain extremely high mass resolution in the acceleration phase through a lens effect.

13 Claims, 2 Drawing Sheets

FIGURE 1
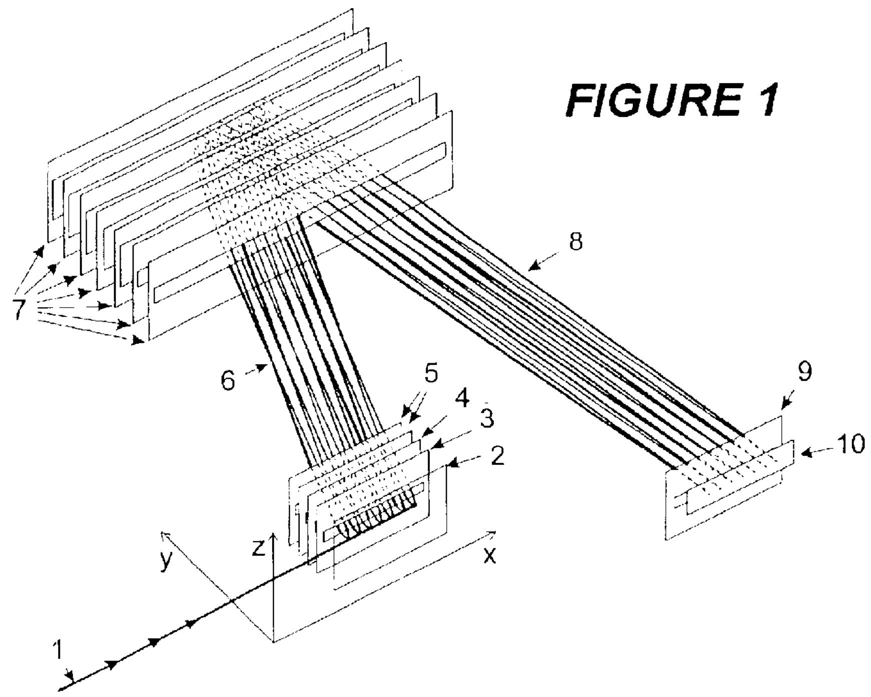
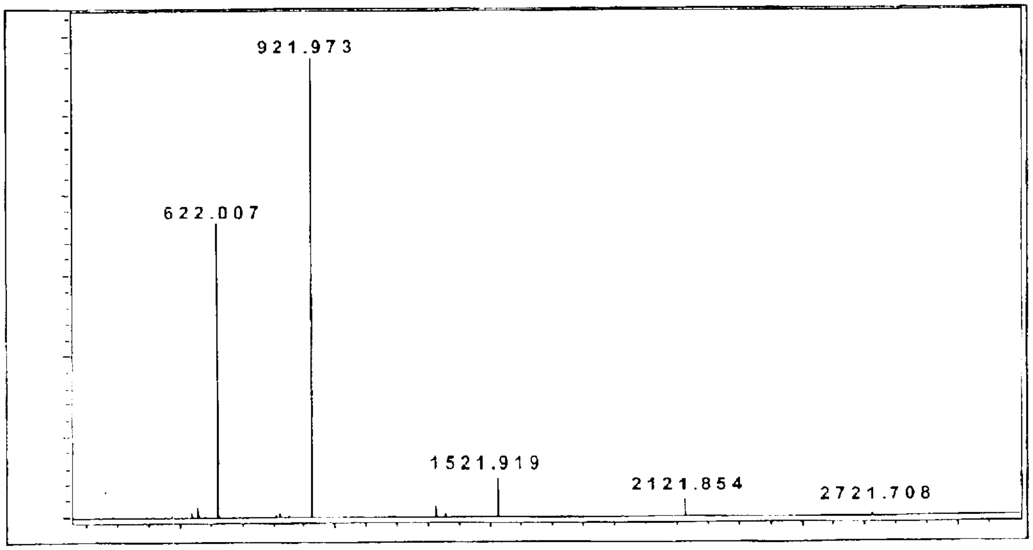
FIGURE 3

PULSERS FOR TIME-OF-FLIGHT MASS SPECTROMETERS WITH ORTHOGONAL ION INJECTION

FIELD OF THE INVENTION

The invention relates to the construction and operation of a slit diaphragm pulser for a time-of-flight mass spectrometer with orthogonal injection of the ions to be examined.

BACKGROUND OF THE INVENTION

Time-of-flight mass spectrometers, which have been known for more than 50 years, have undergone rapid development over about the last 10 years. On the one hand, these devices can advantageously be used for new types of ionization, with which large biomolecules can be ionized, and on the other hand, the development of rapid electronics for digitizing the rapidly varying ion current in the detector has made it possible to construct high resolution devices. Nowadays analog-to-digital converters with an 8 bit dynamic range and a data conversion rate of up to four gigahertz can be obtained, while for the measurement of individual ions, time-to-digital-value converters, with time resolutions in the picosecond range, exist.

Time-of-flight mass spectrometers are often referred to with the abbreviation TOF or TOF-MS.

If mass spectrometry is to be used to measure the masses of large molecules, such as occur particularly in biochemistry, the restricted mass range of other mass spectrometers means that the time-of-flight mass spectrometer is more suitable than any other spectrometer type.

Two different types of time-of-flight mass spectrometer have developed. The first type comprises time-of-flight mass spectrometers for the measurement of ions generated in pulses, for example by matrix assisted laser desorption, abbreviated to MALDI, a method of ionization appropriate for the ionization of large molecules.

The second type comprises time-of-flight mass spectrometers for the continuous injection of a beam of ions, a segment of which is ejected in a "pulser" transverse to the injection direction, and which is allowed to fly through the mass spectrometer as a linearly extended bundle of ions. This generates a ribbon-shaped ion beam. This second type is referred to for short as an orthogonal time-of-flight mass spectrometer (OTOF); it is mainly applied in association with electrospray ionization (ESI). Through the application of a very large number of pulses in a given time (up to 50,000 pulses per second) a large number of spectra, each based on a small number of ions, is generated in order to exploit the ions in the continuous ion beam most effectively. Electrospraying is also suitable for the ionization of large molecules.

These orthogonal time-of-flight mass spectrometers offer the following advantages over other mass spectrometers used for continuous ion beams:

(1) They have a very wide range of masses, even though this is restricted again by a very high pulse rate. At pulse rates of 20 kilohertz, however, it is still possible to achieve a mass range of about 5000 atomic mass units.

(2) They can follow a very rapidly changing substance supply, such as may emerge from a high resolution chromatographic or electrophoretic separator, with great speed, for instance by delivering a sum spectrum every twentieth of a second, each formed by adding a thousand individual spectra. They can, for instance, be used for electrophoretic separation of substances on a chip, which until now has not been possible with any other mass spectrometer.

(3) Above all, these mass spectrometers, even though physically relatively small, are suitable for generating outstanding precision in the mass determination. This point is of particular significance for modern molecular biochemistry and its application fields, but calls for considerable efforts to be made to condition the ion beam injected into the pulser, and for the development of a good pulser that supplies very well resolved ion signals with a highly reproducible, ideally symmetrical, form.

The pulser is always operated in two, repeatedly alternating, phases: (1) the filling phase, in which a fine beam of ions with a diameter of only about one millimeter, consisting of ions moving as parallel as possible, enters into the pulser region and crosses it until the pulser region is just filled with ions having the desired range of masses, and (2) the acceleration phase in which the flying ions are ejected transversely as a pulse and accelerated into the mass spectrometer's drift region. The potentials must be switched over at the start of the acceleration phase extremely fast, within a few tens of nanoseconds. The original flight direction of the low energy ions in the fine ion beam is referred to as the x-direction, and the ions are then pulsed out with high energy, perpendicularly, in the y-direction. The resulting flight direction depends on the relationship of the kinetic energies in the x and y directions; it is close to the y-direction, but is not entirely identical with it.

In principle, the pulser has a very simple construction; the pulser region into which the parallel ion stream is injected in the x-direction is located between a pusher or repeller diaphragm and a puller diaphragm. The pusher does not usually have any apertures. The puller either has a grid or a fine slit through which the ions are ejected as a pulse in the y-direction. The pusher and puller here only carry a small proportion of the entire acceleration voltage, because high voltages cannot be switched with the necessary speed. A compensation diaphragm is positioned after the puller and this suppresses penetration of the main acceleration field into the pulser region. Between the puller and the field-free drift region of the mass spectrometer, at least one additional diaphragm generates the main acceleration field, which provides the major proportion of the acceleration of the ions up to the drift region. The potential is held static on the diaphragms for the main acceleration field. The drift region usually has no field.

In order to achieve high resolution, the mass spectrometer is usually fitted with an energy-focusing reflector. This reflects the ion beam that has been pulsed out towards the ion detector, and provides an accurate time focus at the detector for ions of the same mass but with slightly different energies.

For a high resolution, it is particularly important to provide compensation for the spatial spread of the ions in the y-direction within the ion beam that is injected into the pulser, because the ions from different positions within the cross section of the ion beam must travel flight paths of different lengths to reach the detector.

This spatial expansion of the ion beam within the pulser region, or in other words the finite cross-section of the ion beam consisting of ions moving in parallel, can be compensated for by focusing the distribution of the start locations of the ions according to Wiley and McLaren, (Time-of-Flight Mass Spectrometer with Improved Resolution, Rev. Scient.

Instr. 26, 1150, 1955) through the distribution of the potentials across the start locations when acceleration begins. The ions with different start locations in the y-direction then start from different potentials, and therefore have slightly different kinetic energies when they have passed through all the acceleration fields. Those ions which, because of their start location, must travel a longer flight path before they reach the ion detector are given a somewhat higher energy, and therefore a higher velocity, which allows them to catch up again with those ions with a shorter flight path at a “start location focal point”. All those ions of one mass but with different start locations arrive at this start location focus at exactly the same time but with slightly different velocities.

This start location focal point is advantageously located between the pulser and the reflector. Ions of one mass arrive at this point at the same time, but they do have slightly different kinetic energies (and therefore different flight speeds). This point can therefore be thought of as a virtual ion source, from which ions of one mass start at the same time, but with differing initial velocities. These ions can now be focused by the energy-focusing reflector onto the detector in such a way that ions of one mass arrive here at precisely the same time.

A spread in the initial velocities in the pulser can also be compensated for, as already described by Wiley and McLaren, but only if there is a strict linear correlation between the start location (in the x-direction) and the initial velocity (also in the x-direction). This is, for instance, the case if the ions enter the pulser from one location with slight divergence. A spread in the initial velocities that is not correlated with the start locations cannot be compensated for, and results in a deterioration in the mass resolution capacity. This is what creates the demand for good beam conditioning if good mass resolution is to be achieved.

In commercially manufactured devices, the interior of the pulser is always separated from the electrical field of the main acceleration region by a grid. This means that the ions are pulsed out through the grid. Penetration of the main acceleration field through the grid during the filling phase is relatively slight, and can be controlled.

Grids, however, have disadvantages that are not confined to their restricted transmission and to the small angular spread of the ions caused by distortions of the potential within the grid mesh. It is, in particular, possible for scattered ions to be generated through multiple glancing contacts with the grid wires, or even through surface-induced ion fragmentation (SID=surface induced decomposition).

Pulsers having slit diaphragms are, however, also described in the literature. The most recent state of the art here was reported by A. A. Makarov in WO 01/11660 A1 (PCT/AU00/00922).

Although they have advantages, slits also create problems: the relatively strong, continuously present main acceleration field penetrates into the pulser region during the filling phase and interferes with the filling. The beam of low energy ions is diverted by the penetrating field, no longer runs along the axis of the pulser region, and can even leave the pulser region. This slit diaphragm, moreover, has a very strong focusing or defocusing effect in the acceleration phase in the z-direction (defined as being perpendicular to the x and y directions) on the ions to be accelerated, if even minor field penetration occurs during the acceleration process, i.e. if the acceleration field is not precisely the same on both sides of the puller diaphragm, so that curved equipotential surfaces are generated in the region of the slit.

A. Makarov's patent application is aimed at overcoming these two disadvantages, namely (a) penetration of the main acceleration field and (b) defocusing during the acceleration phase. Between the pulser's drawing diaphragm and the slit diaphragms for generation of the main acceleration field, Makarov inserts a slit diaphragm, referred to here as the compensation diaphragm. During the filling phase its potential relative to the puller diaphragm is selected in such a way that penetration of the main acceleration field through the compensation diaphragm and the puller diaphragm is, evidently, precisely compensated at the location of the fine ion beam (Makarov speaks of stopping the ion beam from “bleeding” out of the pulser region). In the acceleration phase, undesirable focusing effects from the puller diaphragm in the z-direction are cancelled by making the field strengths in the pulser region and in the intermediate space between the puller diaphragm and the compensation diaphragm have very much the same magnitude. There is thus hardly any field penetration during the acceleration phase; this means that curved equipotential surfaces that could create undesired focusing or defocusing are not created. As they pass through the puller diaphragm, the ions still have relatively low energy, and react strongly to curved equipotential surfaces in this region.

In detail, Makarov creates a distance between the puller diaphragm and the compensation diaphragm of exactly the same size as the distance between the pusher electrode and the puller diaphragm. Makarov here switches two potentials, that of the pusher electrode and that of the compensation diaphragm. He leaves the potential of the puller diaphragm unchanged.

During the filling phase, Makarov switches the pusher diaphragm to equal the always constant potential of the puller diaphragm, and the potential of the compensation diaphragm to a potential that generates an ion-retarding field in the pulser region, which may be referred to as compensation of the penetration. In the acceleration phase, Makarov claims to switch the potential of the pusher electrode to such a high ion-repelling potential that it compensates for an initial distribution of the ions at the detector. He claims to switch the compensation electrode to a potential that does not generate any spreading of the beam in the spectrometer's drift region transverse to the slits. He therefore sets up an almost homogenous acceleration through the various acceleration diaphragms, and makes use of only one of the diaphragms to create a slight improvement in the z-focusing (the direction transverse to the slits). It is clear to the specialist, in any case, that with this arrangement the cross section of the ion beam is optimally transferred into the drift region through a nearly homogenous acceleration field extending from the pusher electrode through to the field-free drift region without diverging.

More precise analysis, however, shows that the arrangement and operation of the pulser according to Makarov does not provide the best mass resolution of the ion beam.

The effect of keeping the puller diaphragm at a constant potential according to Makarov is that during the switching the potential in the axis of the injected ion beam is raised. However, the ion beam is injected by an ion-optical system whose last aperture diaphragm is at the potential of the ion beam. The potential of this aperture diaphragm, which is not switched, penetrates asymmetrically into the potential in the pulser region, and inevitably distorts it. It is therefore necessary to select a very long pulser region having a long inlet before the start of the slit opening in the puller diaphragm, in order to cancel out this effect. The same applies to the end of the pulser region. Operation in which the potential in the axis of the injected ion beam is not kept constant thus requires a very long pulser region, much longer than the slit length for pulsed ejection of the ion beam. For a number of reasons, however, a long pulser necessarily lowers the level to which the continuous ion beam from the ion source can be exploited.

However, even with a long pulser, i.e. in the absence of the disturbing influence of the front aperture diaphragms on the resolution, Makarov's implementation does not achieve a very high mass resolution. The reason for this appears to be that the slits in diaphragms of finite thickness still distort the field, even if the field on both sides is the same. It is not practically possible to manufacture slit diaphragms thinner than about 0.3 mm because the diaphragms must have a very high degree of flatness. With a slit width of about a millimeter, the fields penetrating into the slit from the two sides create a lens effect, even if the fields on both sides are equally strong. It is not, however, the slight lens effect that interferes with the resolution. Simulations demonstrate that the marginal beams passing through the slit close to its edges have a dramatically different passage time from the ions that pass centrally through the slit. The difference in passage time amounts to a few nanoseconds, where an attempt is being made to achieve signal widths for the mass peaks of only about two to three nanoseconds. (The desired mass precision of a few parts per million requires the signal time to be measured to within a few picoseconds accuracy.)

SUMMARY OF THE INVENTION

The invention includes switching three diaphragm potentials during the transition from the filling phase to the acceleration phase in order to maintain the potential along the axis of the injected ion beam at a constant level, to prevent any penetration by the accelerating fields during the filling phase and to obtain extremely high mass resolution in the acceleration phase through a lens effect.

The three switched potentials may be the potentials of the pusher, puller and compensation diaphragms. The potentials are preferably switched in such a way that the potential in the axis of the injected ion beam remains constant over time, and the effects of the inlet diaphragm and outlet diaphragm in the pulser region are minimized. If the pusher and puller potentials are not symmetrically switched, these effects provide one of the main reasons for failure to achieve high resolution, at least if the pulser region must be kept acceptably short. Using modern MOSFET transistors, rapid switching of potentials in a range of up to about 1000 volts is relatively economical, so that the price of a further pulse generator is not of great significance.

The potential of the compensation diaphragm compensates for penetration by the main acceleration field during the filling phase, as Makarov has already suggested. Compensation for the field penetration during the filling phase is achieved through a potential at the compensation diaphragm that creates a field between the puller and compensation diaphragms in such a way that its penetration at the position of the ion beam cancels out the penetration of the strong acceleration field through the compensation diaphragm and puller diaphragm as precisely as possible. The pulser is usually constructed in such a way that the injected beam of ions can emerge through a diaphragm with a fine aperture at the other end of the pulser and enter an ion detector. Optimum compensation can then easily be adjusted by switching off the pulsed ejection process and maximizing the strength of the detected ion beam.

In contrast to Makarov's method, however, the potential of the compensation diaphragm in the acceleration phase is high enough for the field strength in the compensation region to be at least twice, and preferably about three times as great as it is in the pulser region. The compensation region is the region between the puller diaphragm and the compensation diaphragm. Moreover, the compensation diaphragm is moved very close to the puller diaphragm, so that the potential difference requiring to be switched at this diaphragm is small, suitable for the MOSFET switch.

The high field strength in the compensation region and the resulting high penetration of the field into the pulser region achieves—as the specialist may find surprising—significantly better mass resolution than can be achieved with the arrangement and operation according to Makarov.

The fine ion beam has a cross section of about a millimeter, and the ions that are distributed over it are strongly focused by the strong field penetration as they are drawn out of the pulser region. The central plane of the pulser is defined here as the plane passing through the center of the slits. The z-direction is perpendicular to the central plane. Those ions in the injected ion beam that are positioned far from the central plane are drawn in to the central plane as they are pulsed out. As they emerge from the compensation region, if the subsequent acceleration fields are as is preferred, somewhat weaker again, then a slight defocusing takes place in the z-direction, generating a beam close to the central plain and, for practical purposes, almost parallel. (The angle to the z-direction is given by $\alpha=\arctan\sqrt{(E_x/E_y)}$ where $E_x$ is the kinetic energy of the ions in the x-direction in the primary beam and $E_y$ is the energy of the ions after acceleration in the y-direction.)

In this way both simulation experiments and actual practice show that the arrival times of all the ions distributed both in the y-direction and the z-direction over the cross section of the ion beam when they reach the "start location focal point" vary not by a few nanoseconds, as in Makarov's mode of operation, but by less than 300 picoseconds.

In addition to the high mass resolution of approximately $R=m/\Delta m=10000$ offered by this arrangement even in relatively small bench devices having only 55 centimeters between pulser and reflector end, this arrangement has further advantages. The ion beam that is pulsed out has practically no contact at all with the edges of the slit diaphragms. Neither scattered ions nor the charge phenomenon reported by Makarov occur. ($\Delta m$ is the width of the mass signal at half the maximum height, while m is the mass, both being measured in mass units).

If the accelerating fields in the further acceleration regions are kept practically the same, then only minimal angular focusing in the z-direction takes place at the further diaphragms of the acceleration field, until the ion beam reaches the last aperture before the field-free drift region. A very slight angular defocusing it is unavoidable here. It is, however, very weak, because the ions here already have a high energy, and are therefore very resistant to deviation. An angular divergence of the ion beam in the z-direction resulting from this defocusing can in any case be compensated for if slightly different acceleration fields are deliberately used at the diaphragms of the acceleration region to generate a slight angular prefocusing. In practice it is possible to use one of the acceleration potentials to adjust the angular focusing of the beam in the z-direction to an optimum level.

BRIEF DESCRIPTION OF THE DRAWINGS

FIG. 1 illustrates the principle of a time-of-flight mass spectrometer with orthogonal injection and a reflector.

FIG. 3 illustrates a spectrum recorded with an orthogonal time-of-flight mass spectrometer operating in accordance with this invention.

Figure 2:
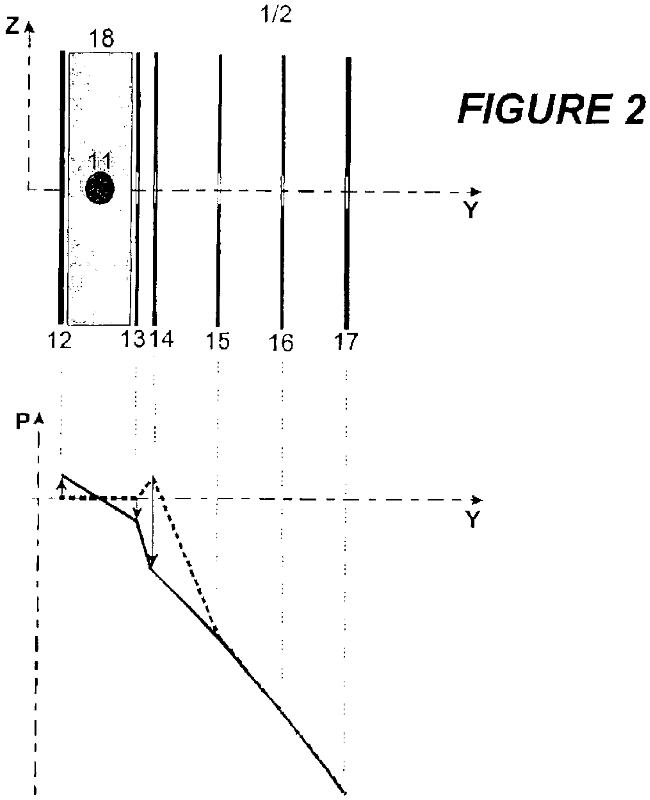
FIG. 2, in the upper part, illustrates the arrangement of the slit diaphragms according to this invention, while in the lower part the figure shows the potential curve in the pulser during the filling phase (dotted line) and during the acceleration phase (solid line).
Figure 4:
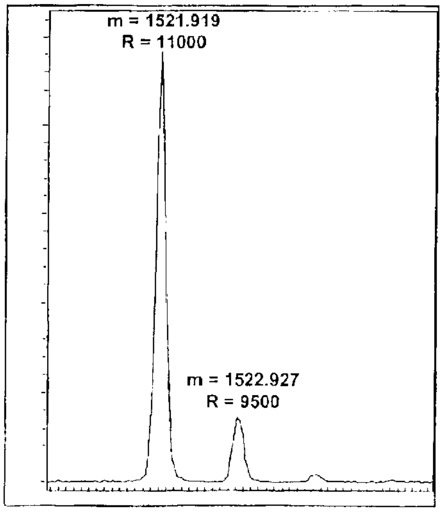
Figure 5:
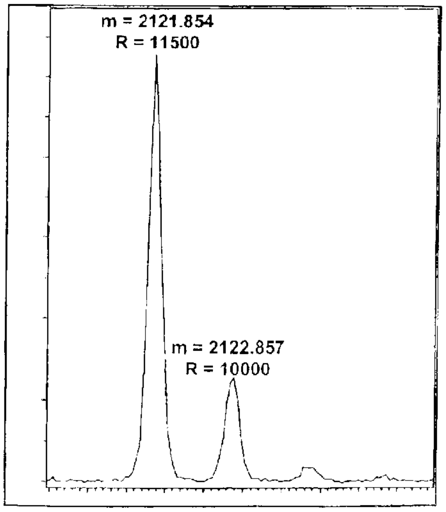

FIGS. of 4 and 5 illustrate sections of the spectrum of FIG. 3 having two mass signals of low-intensity in the medium to high mass range. The mass resolutions here are approximately $R=m/\Delta m=10000$, where m is the mass and $\Delta m$ is the width of the mass signal at half the maximum signal height. The mass signals here have a width of less than three nanoseconds.

DETAILED DESCRIPTION

FIG. 1 illustrates the principle of a time-of-flight mass spectrometer with orthogonal injection and a reflector. The ion beam (1) is injected in the x-direction into a pulser, consisting of the pusher diaphragm (2), puller diaphragm (3), compensation diaphragm (4), and other diaphragms (5) to set up the main acceleration field. The section of the original ion beam (1) that is ejected as a pulse is now converted into a ribbon-shaped ion beam (6) which, if slit diaphragms are used in the pulser, may also have an angular focus in the z-direction. The ribbon-shaped ion beam (6) is reflected in the reflector, which consists here of slit diaphragms (7), and flies as a ribbon-shaped ion beam (8) to the detector (10). The detector can be protected from scattered ions by a slit diaphragm (9).

One preferred embodiment of the pulser is illustrated in FIG. 2. A fine primary ion beam (11) that defines the x-direction is injected into the pulser region between the pusher diaphragm (12) and the puller diaphragm (13). The fine ion beam can originate, for instance, from an electrospray ion source. The pulser here consists of six electrodes, the pusher diaphragm (12) (also known as the repeller), the puller diaphragm (13), the compensation diaphragm (14) and the diaphragms (15), (16) and (17), which carry the continuously present potentials for the main acceleration field. The ion beam (11) consists of ions, with a low kinetic energy of around 20 electron volts, injected through the opening in the entrance diaphragm (18) into the space between the pusher diaphragm (12) and the puller diaphragm (13); the ions are therefore traveling relatively slowly, with a velocity depending on their mass. (More precisely, the velocity depends on the ratio of mass to charge, m/z, but, for reasons of simplicity, the present discussion refers only to mass, m.) During the filling of the pulser with ions, the first two electrodes (the pusher (12) and puller (13)), the entrance diaphragm (18) for the ion beam and the outlet aperture (not visible) are at the same potential as the injected ion beam, essentially maintaining field-free operation in the pulser region, although this can be slightly disturbed by penetration of the main acceleration field. The main acceleration field is formed between the compensation diaphragm (14) and the last slit diaphragm (17) by applying appropriate voltages at the slit diaphragms (15), (16) and (17). This main acceleration field now penetrates through the slits in the compensation diaphragm (14) and the puller diaphragm (13) into the pulser's axis potential.

The distance between the pusher (12) and puller (13) diaphragms is kept as small as possible, in order to work with low voltage levels. The distance can, for instance, be as little as three millimeters with an ion beam diameter of about one millimeter. The compensation diaphragm (14) follows at a distance of only about 0.7 millimeter. Each diaphragm is about 0.3 millimeters thick. The slits in these two diaphragms are preferably one millimeter wide, and thus have a width that corresponds to the diameter of the ion beam in the pulser region. The other diaphragms for the main acceleration field are each three millimeters apart. The total acceleration may, for instance, be around 8.5 kilovolts, with differences of about one kilovolt between the pusher and puller diaphragms in the acceleration phase, another 500 volts between the puller diaphragm and the compensation diaphragm, and 2.5 kilovolts between each of the acceleration diaphragms in the acceleration phase.

This means that during the filling phase the strength of the main acceleration field at the compensation diaphragm (14) is around 700 volts per millimeter. This field now initially penetrates through the one millimeter wide slit in the compensation diaphragm (14), and maintains a field of about 300 volts per millimeter at the slit in the puller electrode diaphragm (13), 0.7 millimeters away. This field in turn penetrates the slit in the puller diaphragm (13), creating a field strength of around 50 volts per millimeter at the position of the ion beam (11). This field would immediately divert the low energy ion beam (11) seriously if compensation were not provided. If, however, a voltage of −200 volts is applied to the compensation electrode (14) relative to the puller diaphragm (13), then this voltage will create a field of −300 volts per millimeter at the slit of the puller diaphragm (13), generating a penetration field of around −50 volts per millimeter at the position of the ion beam (11). This penetration field compensates the penetration field from the main acceleration field, and has a very similar form, because they both virtually originate from the slit diaphragm.

Although precise mathematical analysis of the shapes of the compensating fields at the location of the ion beam shows that they are not precisely identical, the compensation is nevertheless sufficiently good. Adjusting the optimum voltage at the compensation electrode is carried out very easily, as described above, by maximizing the strength of the ion beam that travels through the pulser region and leaves from the exit diaphragm where it is measured by a detector.

A particularly advantageous mode of operation follows from these figures, described here in terms of positive ions that require negative acceleration voltages:

It is assumed here that an energy of 20 electron volts for the injected ions has been found to be optimal. In that case, the axis potential of the pulser is −20 volts during the filling phase. The two neighboring electrodes, the pusher and puller diaphragms, are also at −20 volts. The compensation diaphragm is then at around +180 volts, in order to compensate for the penetration of the main acceleration field. This voltage is adjusted to an optimum value by maximizing the intensity of the ion beam passing through the region. The three acceleration diaphragms are at −2.520 kilovolts, −5.020 kilovolts and −8.520 kilovolts. The field formed between the +180 volts and −2,520 volts at a distance of three millimeters between the puller diaphragm and the compensation diaphragm is the penetrating main acceleration field of about 700 volts per millimeter.

In order to switch on the acceleration phase now in accordance with the invention it is necessary for three potentials to be switched at the same time: the pusher diaphragm to +430 volts, the puller diaphragm to −470 volts and the compensation diaphragm to −920 volts. The three potential differences that are switched are indicated by arrows in the lower part of FIG. 2. The axis of the pulser remains at −20 volts, as before. The field in the pulser region is only minimally disturbed by the entrance and exit diaphragms at the ends, which are also at −20 volts. The field in the compensation region between the puller diaphragm and the compensation diaphragm is now three times greater than the field in the pulser region between the pusher and puller diaphragms. This powerful field almost entirely cancels out the differences in passage time up to the start location focus for ions of a single mass.

"Simultaneous switching" does not refer here to strict simultaneity, and slight differences in the switching times, such as may arise from electrical pulse propagation time differences, are acceptable. In particular, a difference in switching times of up to a few nanoseconds is permissible for the compensation electrode, and it can even be expected that a slight time difference has a favorable effect on the mass resolution.

The field strength in the pulser region is specified according to the start location focus conditions according to Wiley and McLaren, while the focal length to be adjusted up to the start location focus depends on the geometry of the time-of-flight spectrometer. All the other field strengths in the pulser, and therefore the potentials at the diaphragms, in turn all depend on the field strength in the pulser region.

If it is desired to compensate for the slight defocusing that occurs at the transition to the field-free drift region, in order to generate the most parallel beam possible, the voltage at the third diaphragm can be slightly modified so that slight focusing occurs. For reflectors without grids, an angular focus in addition to the start location focus, can be advantageous.

The ions that have left the pulser now form a wide band, the ions of one type forming a front in each case. Light ions fly more rapidly, heavy ions more slowly, but all in the same direction. The field-free flight region must be entirely surrounded by the acceleration potential, so that the flight of the ions is not disturbed.

The focal length leading up to the start-location focal point can to a large extent be freely chosen. It is nevertheless advantageous to locate this start location focus between the pulser exit and the reflector entrance, and to focus this start location focus on the detector by means of the energy focusing reflector with reference to the energy of the particles. If, for instance, a single stage reflector is used, whose length determines its energy focusing length, then a relatively short length can be chosen for such a reflector by bringing the start location focus close to the reflector. A large distance to the start location focus also reduces the field strength in the pulser region. This means that the potentials that have to be switched are lower, which is favorable for the electronics.

Gridless reflectors with slits may be used, as can reflectors that are fitted with grids. If reflectors with grids are used it is favorable to use single-stage reflectors, since in that case it is only necessary for the ion beam to pass through a grid twice. A two-stage form is more advantageous for gridless reflectors, because this generates angular focusing in the z-direction, whereas a single-stage version always defocuses in the z-direction. Gridless forms, however, require unusually difficult adjustment.

Secondary electron multipliers in the form of double microchannel plates are usually used for the detector. The specialist in this field understands how to select from the available types in order to achieve the least possible temporal smearing of the mass signal.

Once the heaviest ions from the interesting range of masses have left the pulser, the electrodes are switched back to the filling phase potentials, and the pulser is filled again from the continuously advancing primary beam.

When the heaviest ions of the mass range under investigation have arrived at the detector and been measured, the pulser is also full again; the next group of ions from the primary ion beam can be ejected as a pulse. Depending on the flight times of the heaviest ions, this process can be repeated between 10,000 and 50,000 times per second. The spectra are added up over a specified recording time, such as 1 second. With such a large number of repetitions it is even possible to measure a type of ion that only occurs once every hundred or thousand times that the pulser is filled. It is, of course, also possible to exploit the rapid sequence of spectra in combination with a short recording time to measure the ions from rapidly changing processes, or from processes that separate substances precisely, such as capillary electrophoresis or micro-column liquid chromatography.

FIG. 3 illustrates a spectrum recorded with an orthogonal time-of-flight mass spectrometer operating in accordance with this invention. The spectrometer, designed as a bench device, has a flight path length from the pulser to the rear end of the reflector of only 55 centimeters. FIGS. of 4 and 5 illustrate sections of this spectrum having two mass signals of low-intensity in the medium to high mass range. The mass resolutions here are approximately $R=m/\Delta m=10000$, where m is the mass and $\Delta m$ is the width of the mass signal at half the maximum signal height. The mass signals here have a width of less than three nanoseconds.

Using the essential features given in this invention it should be possible for any specialist in this field to develop gridless pulsers for time-of-flight mass spectrometers with very high mass resolution. Because the size of the spectrometer and the details of the voltages used depend exclusively on the particular analytic task and other boundary conditions, precise dimensions of such spectrometers, i.e. of flight lengths, slit widths and other geometrical and electrical quantities, are not given here. The basic principles for selection of these details and the methods of mathematical treatment are, however, known to the specialist.

What is claimed is:

1. A pulser apparatus for a time-of-flight mass spectrometer that provides acceleration of a beam of ions in a pulser region, the acceleration being in a direction perpendicular to an initial ion beam direction, wherein ions of the ion beam are introduced to the pulser region during a filling stage and accelerated out of the pulser region during an ejection stage, the apparatus comprising:

a pusher diaphragm located to a side of the pulser region away from a main field region toward which the ions are to be accelerated, the pusher diaphragm having a voltage potential that is switched from a first pusher voltage level to a second pusher voltage level when starting the ejection stage;

a puller diaphragm located to a side of the pulser region opposite the pusher diaphragm, the puller diaphragm having a voltage potential that is switched from a first puller voltage level to a second puller voltage level when starting the ejection stage; and a compensation diaphragm located between the puller diaphragm and the main field region, the compensation diaphragm having a voltage potential that is switched from a first compensation voltage level to a second compensation voltage level when starting the ejection stage so as to minimize penetration of a field from the main field region to the pulser region.

2. An apparatus according to claim 1 further comprising entry and exit diaphragms on opposite sides of the pulser region that allow entry and exit of the ion beam to the pulser region.

3. An apparatus according to claim 2 wherein, during the filling stage, voltage generators for the pusher and puller diaphragms provide approximately the same voltage as is present at the entrance and exit diaphragms.

4. An apparatus according to claim 3 wherein the voltage potential of the compensation diaphragm is switched between two adjustable voltages.

5. An apparatus according to claim 1 wherein a distance between the puller diaphragm and the compensation diaphragm is less than half a distance between the pusher diaphragm and the puller diaphragm.

6. A method for accelerating a beam of ions in a pulser region of a time-of-flight mass spectrometer, the acceleration being in a direction perpendicular to an initial beam direction, the method comprising:

providing a pusher diaphragm having a switchable voltage potential to a side of the pulser region away from a main field region toward which the ions are to be accelerated;

providing a puller diaphragm having a switchable voltage potential to a side of the pulser region opposite the pusher diaphragm;

providing a compensation diaphragm having a switchable voltage potential between the puller diaphragm and the main field region;

introducing the ion beam into the pulser region during a filling stage in which the voltage potentials of the pusher diaphragm, the puller diaphragm and the compensation diaphragm are each in a first state that minimizes disturbance of the ion beam; and switching the voltage potentials of the pusher diaphragm, the puller diaphragm and the compensation diaphragm to cause pulsed ejection of the ions.

7. A method according to claim 6 wherein a voltage potential along an axis of the ion beam remains uniform when the diaphragm potentials are switched.

8. A method according to claim 7 wherein the ion beam is injected into a part of the pulser region that is substantially equidistant from the pusher and puller diaphragms, and wherein the voltage potentials of the pusher and puller diaphragms are switched by equal, but opposite, voltage magnitudes.

9. A method according to claim 6 further comprising, following ejection of the ions from the pulser region, further accelerating the ions by an main acceleration field in the main field region generated by one or more slit diaphragms.

10. A method according to claim 9 wherein voltage potentials at the slit diaphragms of the main acceleration field remain static.

11. A method according to claim 10 wherein, during the filling stage, a voltage potential at the compensation diaphragm minimizes penetration of the main acceleration field into the pulser region.

12. A method according to claim 6 wherein, after switching of the voltage potentials, a potential difference is established between the puller diaphragm and the compensation diaphragm that is at least twice as strong as a potential difference established between the pusher diaphragm and the puller diaphragm.

13. A method according to claim 12 wherein the voltage potential of the compensation diaphragm is adjusted to maximize a resolution of the mass spectrometer.

* * * * *